(12) United States Patent
Ori (10) Patent No.: US 6,654,180 B2
(45) Date of Patent: Nov. 25, 2003

(54) THREE-GROUP ZOOM LENS (75) Inventor: Tetsuya Ori, Koshigaya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/339,295

(22) Filed: Jan. 10, 2003

(65) Prior Publication Data
US 2003/0169508 A1 Sep. 11, 2003

(30) Foreign Application Priority Data
Feb. 4, 2002 (JP) ........................................ 2002-027132

(51) Int. Cl.[7] .............................................. G02B 15/14
(52) U.S. Cl. ........................ 359/689; 359/680; 359/684
(58) Field of Search ................................ 359/680, 682, 359/683, 684, 689

(56) References Cited

U.S. PATENT DOCUMENTS 5,909,318 A * 6/1999 Tanaka ........................ 359/689
6,243,213 B1 * 6/2001 Mori ........................... 359/689
6,304,389 B1 * 10/2001 Shibayama .................. 359/689
6,351,337 B1 2/2002 Tanaka

* cited by examiner

Primary Examiner—Georgia Epps
Assistant Examiner—M. Hasan
(74) Attorney, Agent, or Firm—Arnold International; Jon W. Henry; Bruce Y. Arnold (57) ABSTRACT A three-group zoom lens includes, in order from the object side, a first lens group of negative refractive power, and second and third lens groups, each of positive refractive power. The first and second lens groups include negative and positive components and the third lens group is a single lens component. All the lens components may be single lens elements. When zooming from the wide-angle end to the telephoto end, the second and third lens groups move toward the object side and all three lens groups move such that the group spacings decrease. The second lens group includes a diaphragm on its object side. A constant axial spacing between the second and third lens groups is maintained when zooming while the zoom lens is focused at infinity, and the third lens group is moved toward the object side when focusing from infinity to a near point.

20 Claims, 4 Drawing Sheets

Fig. 1

Fig. 3A Spherical Aberration
Fig. 3B Astigmatism
Fig. 3C Distortion
Fig. 3D Lateral Color Fig. 3E Spherical Aberration
Fig. 3F Astigmatism
Fig. 3G Distortion
Fig. 3H Lateral Color

Fig. 3I Spherical Aberration
Fig. 3J Astigmatism
Fig. 3K Distortion
Fig. 3L Lateral Color Spherical Aberration Fig. 4A | Astigmatism Fig. 4B | Distortion Fig. 4C | Lateral Color Fig. 4D Spherical Aberration Fig. 4E | Astigmatism Fig. 4F | Distortion Fig. 4G | Lateral Color Fig. 4H Spherical Aberration Fig. 4I | Astigmatism Fig. 4J | Distortion Fig. 4K | Lateral Color Fig. 4L

THREE-GROUP ZOOM LENS

BACKGROUND OF THE INVENTION

As with photographic film cameras, compactness, high quality images, and low distortion are required for lenses used in digital and video cameras. In addition, the use of a solid-state image pickup element, such as a CCD array, in digital and video cameras requires that the imaging optical systems of such cameras satisfy particular conditions.

One of the traditional requirements for a solid-state image pickup element, such as one using a CCD array, to most effectively detect light is that the image pickup plane of the element be nearly perpendicular to the central ray of the light being focused on the image pickup plane at all image heights. That requires that the exit pupil position be at a substantial distance (hereinafter termed the exit pupil distance) from the image pickup plane. For further compactness, recently developed CCD arrays receive light most effectively when the exit pupil is located at a finite distance on the object side of the image pickup plane. Reducing the required exit pupil distance is a current subject of development.

Auto-focus systems are commonly used in digital and video cameras, and a high speed of focusing is generally desired, if not demanded. Inner-focus lens systems and rear-focus lens systems, which allow reduced lens weight and shorter lenses, are compatible with auto-focusing and high speed focusing, and are widely used for zoom lenses. As for the number of lens groups, a three-group configuration is preferable to a two-group configuration because it may also be relatively compact and provide better correction of aberrations.

An example of a three-group zoom lens is disclosed in Japanese Laid-Open Patent Application 2000-284177. This application discloses a three-group zoom lens suitable for use with CCD arrays that receive light most effectively when the exit pupil is located at a finite distance. The three-group zoom lens takes advantage of these recently developed CCD arrays and has a small distance between the second and third lens groups when the zoom lens is focused at infinity, which assists in achieving compactness of the zoom lens.

The three-group zoom lens described in the application above is configured suitably for CCD arrays that have an optimum exit pupil distance of approximately five times the maximum image height. However, it receives light less effectively with CCD arrays that have smaller optimum exit pupil distances. Recently developed CCD arrays have an optimum exit pupil distance of approximately 3.5 to five times the maximum image height for use in even more compact camera optical systems. There is a demand for compact three-group zoom lenses designed for use with such CCD arrays.

The three-group zoom lens configuration disclosed in the application above satisfies the requirement of maintaining a constant distance between the second and third lens groups when the zoom lens is focused at infinity but the third lens groups consists of three lens components. There is a demand for three-group zoom lenses that are even more compact but still provide excellent optical performance.

BRIEF SUMMARY OF THE INVENTION

The present invention is a three-group zoom lens suitable for use with solid-state image pickup devices, such as CCD arrays, that are used in digital and video cameras. The three-group zoom lens of the present invention has an optimum exit pupil distance of approximately 3.5 to five times the maximum image height, a zoom ratio of approximately two, a small size, and its aberrations are favorably corrected.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

Figure 1:
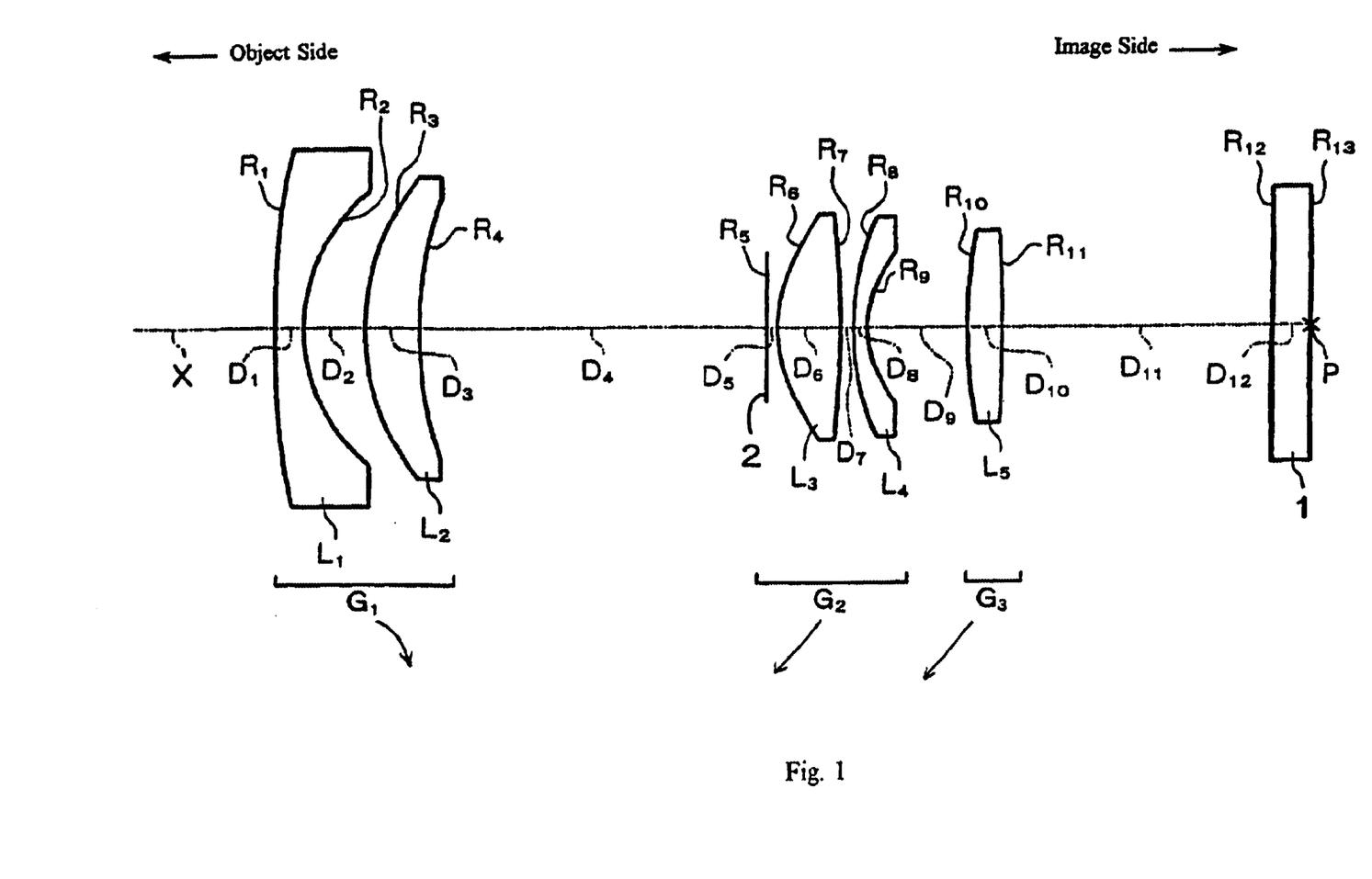
FIG. 1 shows a cross-sectional view of Embodiment 1 of the zoom lens of the present invention.

A general description of the three-group zoom lens of the present invention that pertains to all three embodiments of the invention will first be described with reference to FIG. 1, that shows Embodiment 1. In FIG. 1, refractive optical elements, including lens elements, are referenced by the letter L with a subscript denoting their order from the object side of the zoom lens, and similarly the radii of curvature of the surfaces of those optical elements, generally lens surfaces, are referenced by the letter R with a subscript denoting their order from the object side of the zoom lens. The on-axis surface spacings (along the optical axis X of the figure) of all the optical surfaces are referenced by the letter D with a subscript denoting their order from the object side of the zoom lens. In the same manner, the three lens groups are labeled $G_1$ through $G_3$ in order from the object side of the zoom lens and the lens components belonging to each lens group are indicated by lower brackets adjacent the labels $G_1$–$G_3$.

The term "lens group" is defined in terms of "lens elements" and "lens components" as explained herein. The term "lens element" is herein defined as a single transparent mass of refractive material. The term "lens component" is herein defined as: (a) a single lens element spaced so far from any adjacent lens element that the spacing cannot be neglected in computing the optical image-forming properties of the lens elements, or (b) two or more lens elements that have their adjacent lens surface either in contact or so close together that the spacings between adjacent lens surfaces of the different lens elements are so small that the spacings can be neglected in computing the optical image-forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed, or are movable as a single unit.

As shown in FIG. 1, the zoom lens of the present invention is formed of, in order from the object side: a first lens group $G_1$ of negative refractive power, a second lens group $G_2$ of positive refractive power with a diaphragm or stop 2 included with the second lens group $G_2$, and a third lens group $G_3$ of positive refractive power. The diaphragm or stop 2 included with the second lens group $G_2$ limits the light passing through the zoom lens.

In the three-group zoom lens of the present invention, all three lens groups move when zooming, and the second and third lens groups move toward the object side and decrease their distances from the first lens group $G_1$ when zooming from the wide-angle end to the telephoto end. The third lens group $G_3$ is moved toward the object side when focusing from infinity to a near point. The first lens group $G_1$ includes two lens components that are, in order from the object side, a negative meniscus lens component with its concave lens surface on the image side and a positive meniscus lens component with its convex surface on the object side. The second lens group $G_2$ includes two lens components that are, in order from the object side, a positive lens component with its lens surface of greater curvature being convex and being on the object side and a negative lens component with its lens surface of greater curvature being concave and being on the image side. The third lens group $G_3$ includes a positive lens component. The diaphragm or stop 2 is on the object side of the second lens group $G_2$. A cover glass 1, including a low pass filter or an infrared-blocking filter, is provided between the third lens group $G_3$ and the image point P on the image plane (i.e., the CCD array image pickup plane).

At least one lens surface of each of the negative meniscus lens component of the first lens group $G_1$ and the positive lens component of the second lens group $G_2$ is an aspherical surface. The use of aspherical lens surfaces enables a reduction in the number of lens elements and lens components used while achieving sufficiently high resolution and aberration correction. In the present invention, the number of lens components in both the first lens group $G_1$ and the second lens group $G_2$ is reduced to only two lens components, and in fact, only two lens elements.

By making all three lens groups movable, the barrel retraction mechanism is easily installed. Using only two lens elements in the second lens group $G_2$ helps in making the zoom lens light weight and compact, especially in terms of providing a short retracted length to the zoom lens.

As shown in FIG. 1, the first lens group $G_1$ includes, in order from the object side, a first lens component $L_1$ that consists of a negative meniscus lens element with its concave lens surface on the image side and having at least one aspherical surface and a second lens component $L_2$ that consists of a positive meniscus lens element with its convex lens surface on the object side. The second lens group $G_2$ includes, in order from the object side, a third lens component $L_3$ that consists of a positive lens element with its lens surface of greater curvature being convex and being on the object side and having at least one aspherical lens surface, and a fourth lens component $L_4$ that consists of a negative lens element with its lens surface of greater curvature being concave and being on the image side. The third lens group $G_3$ is formed of a fifth lens element $L_5$ of positive refractive power.

Those surfaces that are aspherical satisfy the following equation:

$$Z=[(Y^2/R)/\{1+(1-K\ Y^2/R^2)^{1/2}\}]+A_4Y^4+A_6Y^6+A_8Y^8+A_{10}Y^{10} \quad \text{(Equation A)}$$

where

Z is the length (in mm) of a line drawn from a point on the aspherical surface at a distance Y from the optical axis to the tangential plane of the aspherical surface vertex, R is the radius of curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

The distance between the second and third lens groups is substantially fixed during zooming when the zoom lens is focused at infinity. This allows for proper exit pupil location in relation to the location of the third lens group $G_3$ and the location of the image plane of the zoom lens where the solid-state image pickup device is located. This also allows for the movement required of a rear-focusing lens arrangement. This, in turn, helps in designing a zoom lens that is compact and suitable for high speed focusing.

Further, preferably the following condition is satisfied:

$$0.4<f_w/|f_1|<0.7 \quad \text{Condition (1)}$$

where $f_w$ is the focal length of the three-group zoom lens at the wide-angle end, and $f_1$ is the focal length of the first lens group $G_1$.

Condition (1) controls the image magnification resulting from the combination of the second and third lens groups $G_2$ and $G_3$ at the wide-angle end. It helps ensure good balance and compactness with favorable correction of aberrations through a zoom range of about two times. If the above ratio of focal lengths is smaller than the lower limit of Condition (1), the zoom lens is too long at the wide-angle end, thereby failing to achieve compactness, and the zoom lens has a short back focus at the wide-angle end that does not leave enough space for a low pass filter between the third lens group $G_3$ and the image pickup plane. On the other hand, if the above ratio of focal lengths is larger than the upper limit of Condition (1), the first lens group $G_1$ has an excessively large refractive power that is difficult to produce with only two lens components, especially only two lens elements.

Further, preferably the following condition is satisfied:

$$0.8<f_T/|f_1|<1.3 \quad \text{Condition (2)}$$

where $f_T$ is the focal length of the three-group zoom lens at the telephoto end, and $f_1$ is the focal length of the first lens group $G_1$.

Condition (2) controls the image magnification resulting from the combination of the second and third lens groups $G_2$ and $G_3$ at the telephoto end. It helps ensure good balance and compactness with favorable correction of aberrations through a zoom range of about two times. If the above ratio of focal lengths is smaller than the lower limit of Condition (2), the first lens group $G_1$ has to be moved very far during zooming in order to obtain a zoom ratio of about two times, thereby failing to achieve compactness. If the above ratio of focal lengths is larger than the upper limit of Condition (2), the first lens group $G_1$ requires a large back and forth movement along the optical axis during zooming, which makes obtaining and maintaining precise movement of that lens group very difficult.

Additionally, preferably the following condition is satisfied:

$$0.3 < f_2/f_3 < 1.0 \qquad \text{Condition (3)}$$

where $f_2$ is the focal length of the second lens group $G_2$, and $f_3$ is the focal length of the third lens group $G_3$.

Condition (3) assures appropriate distribution of refractive indices between the second and third lens groups $G_2$ and $G_3$. If the above ratio of focal lengths is smaller than the lower limit of Condition (3), the third lens group $G_3$ has an excessively small refractive power and therefore has to be moved too far during focusing. This creates undesirable variations in the field of view during focusing. If the above ratio of focal lengths is larger than the upper limit of Condition (3), the third lens group $G_3$ has an excessively large refractive power that is hard to produce with a single lens component, especially a single lens element.

Also, preferably the following condition is satisfied:

$$0.08 < D_{2W}/f_3 < 0.15 \qquad \text{Condition (4)}$$

where $D_{2W}$ is the distance along the optical axis, when the zoom lens is at the wide-angle end and focused at infinity, between the lens surface of the second lens group $G_2$ that is nearest the image side and the lens surface of the third lens group $G_3$ that is nearest the object side, and $f_3$ is the focal length of the third lens group $G_3$.

Condition (4) controls the distance between the second and third lens groups $G_2$ and $G_3$. This condition relates to the three-group zoom lens of the present invention being used with CCD arrays that have an optimum exit pupil distance of 3.5 to 5 times the maximum image height. These recently developed CCD arrays have relaxed the requirements for normal incident angles of the main ray entering the image pickup plane that is associated with relatively large exit pupil distances that had been required of optical systems used for imaging onto solid-state image pickup elements using a CCD array. One result is that the third lens group $G_3$ no longer needs to be placed as far from the second lens group $G_2$. That is, the second and third lens groups $G_2$ and $G_3$ can be closer to each other when the relative optimum exit pupil distance is shortened, including when a substantially constant distance is maintained between the second and third lens groups $G_2$ and $G_3$ during zooming when the zoom lens is focused at infinity. Reducing the distance between the second and third lens groups $G_2$ and $G_3$ helps make a more compact zoom lens.

If the above ratio of focal lengths defined in Condition (4) is smaller than the lower limit of Condition (4), there is not enough space for the third lens group $G_3$ to move during focusing for the required range of focusing. Additionally, the position of the exit pupil relative to the image pickup plane is not properly maintained. If the above ratio of focal lengths is larger than the lower limit of Condition (4), the position of the exit pupil relative to the image pickup plane is easily properly maintained. However, if the above ratio of focal lengths is larger than the upper limit of Condition (4), the distance between the second and third lens groups $G_2$ and $G_3$ is too large and the fifth lens component $L_5$ of the third lens group $G_3$ must have an excessively large diameter.

Also, preferably the following condition is satisfied:

$$v_{2p} - v_{2n} > 20 \qquad \text{Condition (5)}$$

where $v_{2p}$ is the Abbe number (at the d-line) of a positive lens element of the second lens group, and $v_{2n}$ is the Abbe number (at the d-line) of a negative lens element of the second lens group.

Condition (5) defines how much greater the Abbe number of a positive lens element in the second lens group $G_2$, $L_3$ as shown in FIG. 1, must be than the Abbe number of a negative lens element in the second lens group $G_2$, $L_4$ as shown in FIG. 1. Condition (5) enables aberrations to be favorably corrected with only two lens components, in fact, with only two lens elements. If Condition (5) is not satisfied, it is very difficult to prevent large fluctuations in lateral color at the wide-angle end and axial chromatic aberration during zooming.

Further, preferably the following condition is satisfied:

$$N_{1n} > 1.68 \qquad \text{Condition (6)}$$

where $N_{1n}$ is the refractive index of a negative lens element of the first lens group $G_1$.

Condition (6) sets a lower limit for the refractive index of the negative lens element $L_1$ in FIG. 1. If Condition (6) is not satisfied, the concave surface of the first lens element $L_1$ would need to have even greater curvature, which would make correction of astigmatism and distortion at the wide-angle end very difficult, even with the use of aspherical lens surfaces.

Additionally, preferably the following condition is satisfied:

$$v_{1n} - v_{1p} > 11 \qquad \text{Condition (7)}$$

where $v_{1n}$ is the Abbe number (at the d-line) of a negative lens element of the first lens group, and $v_{1p}$ is the Abbe number (at the d-line) of a positive lens element of the first lens group.

Condition (7) defines how much greater the Abbe number of a negative lens element in the first lens group $G_1$ ($L_1$ as shown in FIG. 1) must be than the Abbe number of a positive lens element in the first lens group $G_1$ ($L_2$ as shown in FIG. 1). If Condition (7) is not satisfied, it is very difficult to prevent large fluctuations in lateral color and axial chromatic aberration during zooming.

As described above, the three-group zoom lens of the present invention is suitable for use with solid-state image pickup devices that include CCD arrays, such as digital and video cameras, that have an optimum exit pupil distance of 3.5 to 5 times the maximum image height. When the zoom lens is focused at infinity, the distance between the second and third lens groups is kept small and is fixed during zooming. This allows for rear-focusing suitable for high speed focusing and compactness of the zoom lens. Including lens surfaces that are aspherical and which satisfy Conditions (1) through (7) above enables a zoom lens to be provided which has a zoom ratio of approximately 2, provides a reduction in the number of lens components and lens elements required, and provides a reduction in the length of a zoom lens when retracted. In addition, including lens surfaces that are aspherical and which satisfy Conditions (1) through (7) above allows for general compactness of the zoom lens and favorable correction of aberrations over the entire range of focusing and zooming.

Three embodiments of the present invention will now be described with reference to FIG. 1 of the drawings.

Embodiment 1

FIG. 1 shows the basic lens element configurations of the three-group zoom lens of Embodiment 1. In Embodiment 1, the third lens component (i.e., the first lens component of the second lens group $G_2$) is a biconvex lens element $L_3$ with its lens surface of greater curvature on the object side, the fourth lens component (i.e., the second lens component of the second lens group $G_2$) is a negative meniscus lens element $L_4$ with its concave lens surface on the image side, and the fifth lens component (i.e., the sole lens of the third lens group $G_3$), is a biconvex lens element $L_5$ with its lens surface of greater curvature on the object side. The object-side surface of the first lens element $L_1$ and both lens surfaces of the third lens element $L_3$ are aspherical, with their shapes defined by Equation (A) above.

Table 1 below lists the surface number #, in order from the object side, the radius of curvature R in millimeters (mm) of each surface near the optical axis, the on-axis surface spacing D (mm), as well as the refractive index $N_d$ and the Abbe number $v_d$ (at the d-line) of each lens element for Embodiment 1. Listed in the bottom portion of Table 1 are the focal length f, the f-number $F_{NO}$, and the image angle $2\omega$ at each of the wide-angle and telephoto ends, respectively, for Embodiment 1.

TABLE 1

| # | R | D | $N_d$ | $v_d$ |
|---|---|---|---|---|
| 1* | 48.9654 | 1.000 | 1.80348 | 40.4 |
| 2 | 6.4201 | 2.219 | | |
| 3 | 8.6559 | 2.002 | 1.80519 | 25.4 |
| 4 | 14.6554 | $D_4$(variable) | | |
| 5 (stop) | ∞ | 0.450 | | |
| 6* | 5.4696 | 2.360 | 1.69078 | 53.0 |
| 7* | −29.7518 | 0.520 | | |
| 8 | 10.0120 | 0.520 | 1.84667 | 23.8 |
| 9 | 4.2552 | $D_9$(variable) | | |
| 10 | 19.8824 | 1.270 | 1.48749 | 70.2 |
| 11 | −71.0785 | $D_{11}$(variable) | | |
| 12 | ∞ | 1.390 | 1.51680 | 64.2 |
| 13 | ∞ | | | | f =9.16–16.90  $F_{NO}$ = 3.3–4.3  $2\omega$ = 55.3°–31.7°

Those surfaces with a * to the right of the surface number in Table 1 are aspherical, and the aspherical surface shape is expressed by Equation (A) above.

Table 2 below lists the values of the constants K, $A_4$, $A_6$, $A_8$, and $A_{10}$ used in Equation (A) above for each of the aspherical surfaces indicated in Table 1. An "E" in the data indicates that the number following the "E" is the exponent to the base 10. For example, "1.0E-02" represents the number $1.0 \times 10^{-2}$.

TABLE 2

| # | K | $A_4$ | $A_6$ | $A_8$ | $A_{10}$ |
|---|---|---|---|---|---|
| 1 | −4.44206 | 1.07743E-4 | −6.88401E-7 | 6.22159E-8 | −8.90237E-10 |
| 6 | −1.81905E-1 | 3.40501E-4 | −1.04880E-5 | 1.33698E-6 | −7.99645E-8 |
| 7 | 7.15974E-1 | 2.94330E-4 | −5.32832E-6 | −8.69632E-7 | 5.11946E-8 |

In the zoom lens of Embodiment 1, all three lens groups move to vary their separations during zooming except that the second lens group $G_2$ and the third lens group $G_3$ maintain a substantially constant separation during zooming when the zoom lens is focused at infinity. Therefore, the values of the on-axis spacings $D_4$, $D_9$ and $D_{11}$ may vary.

Table 3 below lists the values of the variables $D_4$, $D_9$ and $D_{11}$ (i.e., the group spacings) at the wide-angle end (Wide) with a focal length of the three-group zoom lens of 9.16 mm, at an intermediate focal length (Middle) with a focal length of the three-group zoom lens of 12.45 mm, and at the telephoto end (Tele) with a focal length of the three-group zoom lens of 16.90 mm.

TABLE 3

| | Wide | Middle | Tele |
|---|---|---|---|
| $D_4$ | 12.753 | 7.081 | 2.934 |
| $D_9$ | 3.669 | 3.669 | 3.669 |
| | (2.383) | (2.571) | (1.874) |
| $D_{11}$ | 9.856 | 12.212 | 15.393 |
| | (11.141) | (13.310) | (17.188) |

The numbers not in parentheses in Table 3 are for the zoom lens focused at infinity. The numbers in parentheses in Table 3 are for the zoom lens when focused at near points. The near points at the wide-angle end and telephoto end are positioned 100 mm and 200 mm, respectively, from the on-axis location of the object side lens surface of the first lens element $L_1$.

As set forth in Table 4 below, the three-group zoom lens of Embodiment 1 of the present invention satisfies all of Conditions (1) through (7) above. The bottom portion of Table 4 recites, where necessary, the quantities that have been used to calculate the values that satisfy Conditions (1) through (7).

TABLE 4

| Condition No. | Condition | Value |
|---|---|---|
| (1) | $0.4 < f_w / |f_1| < 0.7$ | 0.553 |
| (2) | $0.8 < f_T / |f_1| < 1.3$ | 1.020 |
| (3) | $0.3 < f_2 / f_3 < 1.0$ | 0.437 |
| (4) | $0.08 < D_{2W} / f_3 < 0.15$ | 0.115 |
| (5) | $v_{2p} − v_{2n} > 20$ | 29.2 |
| (6) | $N_{1n} > 1.68$ | 1.803 |
| (7) | $v_{1n} − v_{1p} > 11$ | 15.0 |

$f_w$ = 9.158 mm  $f_1$ = −16.566 mm  $f_T$ = 16.907 mm  $f_2$ = 13.981 mm  $f_3$ = 32.017 mm  $D_{2W}$ = 3.669  $v_{2p}$ = 53.0  $v_{2n}$ = 23.8  $v_{1n}$ = 40.7  $v_{1p}$ = 25.4

Figures 2A, 2B:
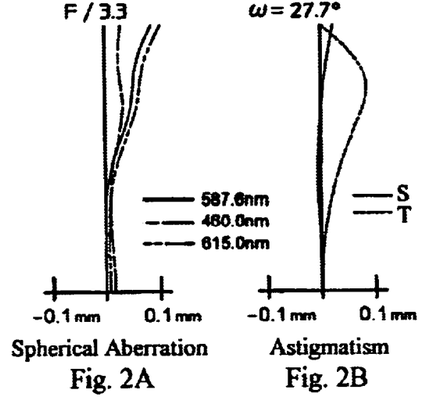
FIGS. 2A–2D show aberrations of Embodiment 1 of the zoom lens of the present invention at the wide-angle end.
Figure 2C:
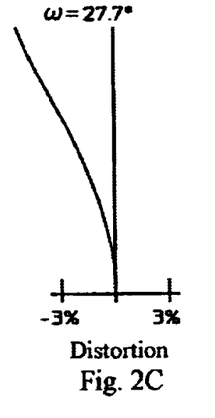
Figure 2D:
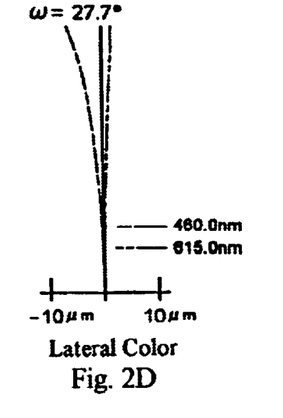
Figures 2E, 2F:
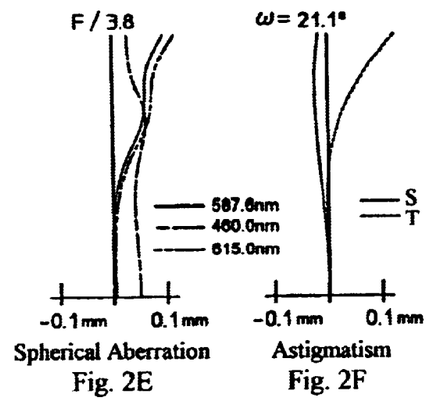
FIGS. 2E–2H show aberrations of Embodiment 1 of the zoom lens of the present invention at an intermediate position.
Figure 2G:
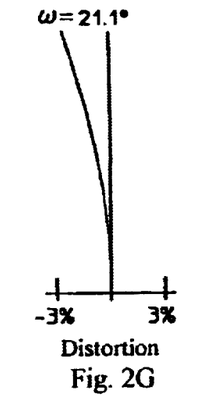
Figure 2H:
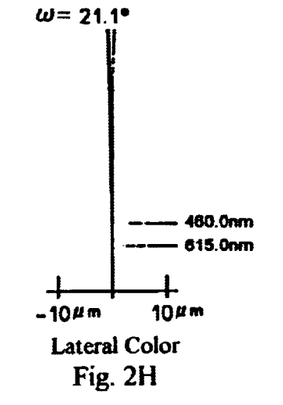
Figures 2I, 2J:
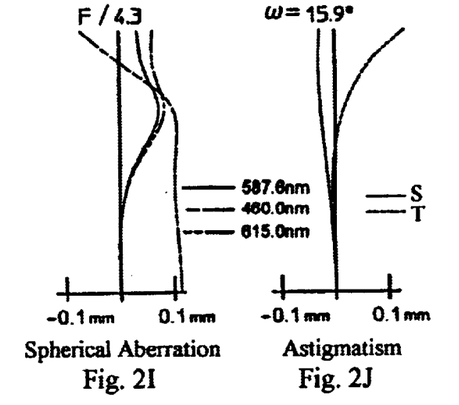
FIGS. 2I–2L show aberrations of Embodiment 1 of the zoom lens of the present invention at the telephoto end.
Figure 2K:
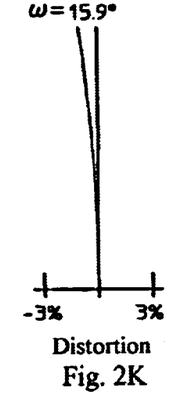
Figure 2L:
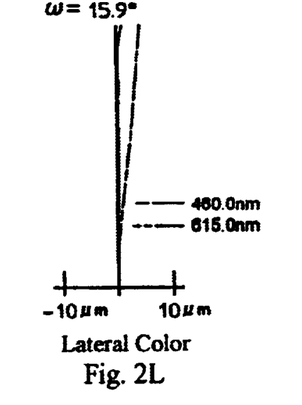

FIGS. 2A–2D show the spherical aberration, astigmatism, distortion, and lateral color, respectively, of the zoom lens of Embodiment 1 at the wide-angle end. FIGS. 2E–2H show the spherical aberration, astigmatism, distortion, and lateral color, respectively, of the zoom lens of Embodiment 1 at the intermediate focal length, and FIGS. 2I–2L show the spherical aberration, astigmatism, distortion, and lateral color, respectively, of the zoom lens of Embodiment 1 at the telephoto end. In FIGS. 2A, 2E, and 2I, the spherical aberration is shown for the wavelengths 587.6 nm (the d-line), 460.0 nm, and 615.0 nm. In the remaining figures, ω is the half-picture angle. In FIGS. 2B, 2F and 2J, the astigmatism is shown for both the sagittal image surface S and the tangential image surface T. In FIGS. 2C, 2G and 2K, distortion is measured at 587.6 nm (the d-line). In FIGS. 2D, 2H and 2L, the lateral color is shown for the wavelengths 460.0 nm and 615.0 nm relative to 587.6 nm (the d-line). As is apparent from these figures, the various aberrations are favorably corrected.

Those surfaces with a * to the right of the surface number in Table 5 are aspherical, and the aspherical surface shape is expressed by Equation (A) above.

Table 6 below lists the values of the constants K, $A_4$, $A_6$, $A_8$, and $A_{10}$ used in Equation (A) above for each of the aspherical surfaces indicated in Table 5. An "E" in the data indicates that the number following the "E" is the exponent to the base 10. For example, "1.0E-02" represents the number $1.0 \times 10^{-2}$.

TABLE 6

| # | K | $A_4$ | $A_6$ | $A_8$ | $A_{10}$ |
| --- | --- | --- | --- | --- | --- |
| 1 | −4.45916 | 1.10676E-4 | −1.51234E-6 | 1.02278E-7 | −1.45462E-9 |
| 6 | 5.65855E-1 | −1.74707E-4 | −1.38158E-5 | 1.76621E-6 | −3.27037E-8 |
| 7 | 9.96483E-1 | 4.68390E-4 | −7.31844E-6 | 8.49719E-7 | 2.30317E-8 |
| 10 | −1.00000E-7 | −1.53659E-4 | −1.25610E-5 | −9.10390E-7 | 7.27414E-8 |

Embodiment 2

FIG. 1 also shows the basic lens element configurations of the three-group zoom lens of Embodiment 2. Embodiment 2 is very similar to Embodiment 1 and similarly uses three lens groups. Because Embodiment 2 is very similar to Embodiment 1, only the differences between Embodiment 2 and Embodiment 1 will be explained. Whereas in Embodiment 1 the object side lens surface of lens element $L_5$ was spherical, in Embodiment 2 the object side lens surface of lens element $L_5$ is aspherical.

Table 5 below lists the surface number #, in order from the object side, the radius of curvature R in millimeters (mm) of each surface near the optical axis, the on-axis surface spacing D (mm), as well as the refractive index $N_d$ and the Abbe number $v_d$ (at the d-line) of each lens element for Embodiment 2. Listed in the bottom portion of Table 5 are the focal length f, the f-number $F_{NO}$, and the image angle 2ω at each of the wide-angle and telephoto ends, respectively, for Embodiment 2.

TABLE 5

| # | R | D | $N_d$ | $v_d$ |
| --- | --- | --- | --- | --- |
| 1 | 61.2065 | 1.70000 | 1.80610 | 40.7 |
| 2 | 6.0911 | 1.83026 | | |
| 3 | 8.1156 | 2.05936 | 1.80519 | 25.4 |
| 4 | 14.9727 | $D_4$(variable) | | |
| 5 (stop) | ∞ | 0.80000 | | |
| 6* | 5.6106 | 2.25470 | 1.69350 | 53.2 |
| 7* | −21.3192 | 0.38539 | | |
| 8 | 15.6223 | 0.65000 | 1.84667 | 23.8 |
| 9 | 5.0857 | $D_9$(variable) | | |
| 10* | 25.6295 | 1.50000 | 1.56865 | 58.1 |
| 11 | −72.4521 | $D_{11}$(variable) | | |
| 12 | ∞ | 1.51000 | 1.51680 | 64.2 |
| 13 | ∞ | | | | f = 8.79–16.26    $F_{NO}$ = 3.3–4.3    2ω = 57.3°–32.9°

In the zoom lens of Embodiment 2, all three lens groups move to vary their separations during zooming except that the second lens group $G_2$ and the third lens group $G_3$ maintain a substantially constant separation during zooming when the zoom lens is focused at infinity. Therefore, the values of the on-axis spacings $D_4$, $D_9$ and $D_{11}$ may vary.

Table 7 below lists the values of the variables $D_4$, $D_9$ and $D_{11}$ (i.e., the group spacings) at the wide-angle end (Wide) with a focal length of the three-group zoom lens of 8.79 mm, at an intermediate focal length (Middle) with a focal length of the three-group zoom lens of 11.95 mm, and at the telephoto end (Tele) with a focal length of the three-group zoom lens of 16.26 mm.

TABLE 7

| | Wide | Middle | Tele |
| --- | --- | --- | --- |
| $D_4$ | 12.277 | 6.782 | 2.740 |
| $D_9$ | 3.625 | 3.625 | 3.625 |
| | (2.376) | (2.561) | (1.894) |
| $D_{11}$ | 9.413 | 11.687 | 14.781 |
| | (10.661) | (12.751) | (16.512) |

The numbers not in parentheses in Table 7 are for the zoom lens focused at infinity. The numbers in parentheses in Table 7 are for the zoom lens when focused at near points. The near points at the wide-angle end and telephoto end are positioned 100 mm and 200 mm, respectively, from the on-axis location of the object side lens surface of the first lens element $L_1$.

The three-group zoom lens of Embodiment 2 of the present invention satisfies all of Conditions (1) through (7) above as set forth in Table 8 below. The bottom portion of Table 8 recites, where necessary, the quantities that have been used to calculate the values that satisfy Conditions (1) through (7).

TABLE 8

| Condition No. | Condition | Value |
| --- | --- | --- |
| (1) | $0.4 < f_w / |f_1| < 0.7$ | 0.552 |
| (2) | $0.8 < f_T / |f_1| < 1.3$ | 1.020 |
| (3) | $0.3 < f_2 / f_3 < 1.0$ | 0.399 |
| (4) | $0.08 < D_{2W} / f_3 < 0.15$ | 0.108 |
| (5) | $v_{2p} - v_{2n} > 20$ | 29.4 |

TABLE 8-continued

| Condition No. | Condition | Value |
|---|---|---|
| (6) | $N_{1n} > 1.68$ | 1.806 |
| (7) | $v_{1n} - v_{1p} > 11$ | 15.3 |

$f_W = 8.7875$ mm   $f_1 = -15.931$ mm   $f_T = 16.256$ mm   $f_2 = 13.368$ mm   $f_3 = 33.479$ mm   $D_{2W} = 3.625$   $v_{2p} = 53.2$   $v_{2n} = 23.8$   $v_{1n} = 40.7$   $v_{1p} = 25.4$

Figures 3A, 3B, 3C:
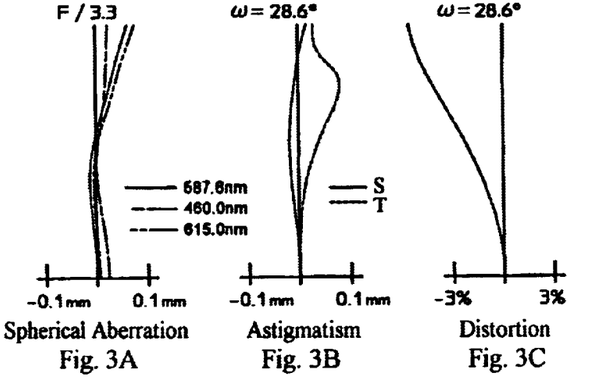
FIGS. 3A–3D show aberrations of Embodiment 2 of the zoom lens of the present invention at the wide-angle end.
Figure 3D:
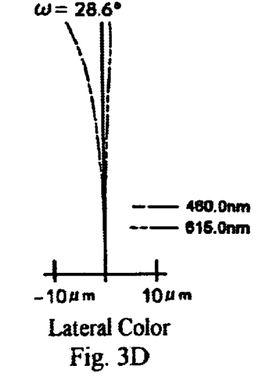
Figures 3E, 3F, 3G:
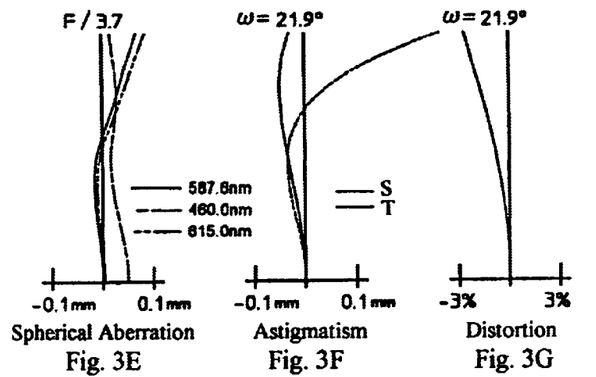
FIGS. 3E–3H show aberrations of Embodiment 2 of the zoom lens of the present invention at an intermediate position.
Figure 3H:
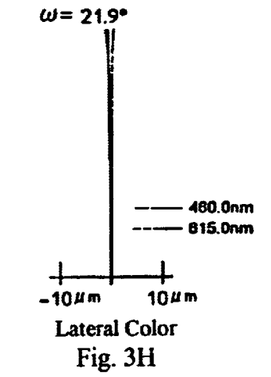
Figures 3I, 3J, 3K:
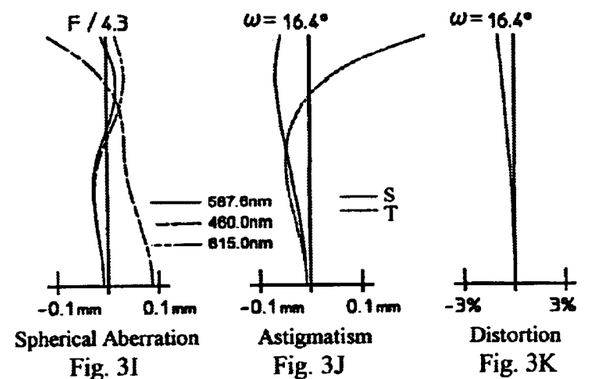
FIGS. 3I–3L show aberrations of Embodiment 2 of the zoom lens of the present invention at the telephoto end.
Figure 3L:
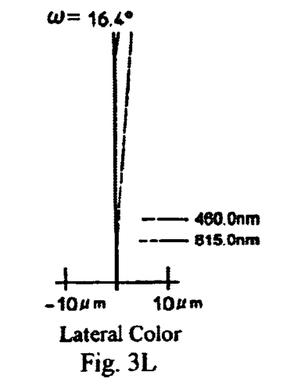

FIGS. 3A–3D show the spherical aberration, astigmatism, distortion, and lateral color, respectively, of the zoom lens of Embodiment 2 at the wide-angle end. FIGS. 3E–3H show the spherical aberration, astigmatism, distortion and lateral color, respectively, of the zoom lens of Embodiment 2 at the intermediate focal length, and FIGS. 3I–3L show the spherical aberration, astigmatism, distortion, and lateral color, respectively, of the zoom lens of Embodiment 2 at the telephoto end. In FIGS. 3A, 3E and 3I, the spherical aberration is shown for the wavelengths 587.6 nm (the d-line), 460.0 nm, and 615.0 nm. In the remaining figures, ω is the half-picture angle. In FIGS. 3B, 3F and 3J, the astigmatism is shown for both the sagittal image surface S and the tangential image surface T. In FIGS. 3C, 3G and 3K, distortion is measured at 587.6 nm (the d-line). In FIGS. 3D, 3H and 3L, the lateral color is shown for the wavelengths 460.0 nm and 615.0 nm relative to the 587.6 nm (the d-line). As is apparent from these figures, the various aberrations are favorably corrected.

Embodiment 3

Embodiment 3 is very similar to the basic lens element configuration of FIG. 1 and to Embodiments 1 and 2.

Because Embodiment 3 is very similar to FIG. 1 and to Embodiments 1 and 2, only the differences between Embodiment 3 and Embodiments 1 and 2, as well as FIG. 1, will be explained for Embodiment 3. Whereas in Embodiment 1 the object side lens surface of the biconvex lens element $L_5$ had the greater curvature, in Embodiment 3 the image side lens surface of the biconvex lens element $L_5$ has the greater curvature. Unlike Embodiment 2, but like Embodiment 1, in Embodiment 3 both lens surfaces of biconvex lens element $L_5$ are spherical.

Table 9 below lists the surface number #, in order from the object side, the radius of curvature R in millimeters (mm) of each surface near the optical axis, the on-axis surface spacing D (mm), as well as the refractive index $N_d$ and the Abbe number $v_d$ (at the d-line) of each lens element for Embodiment 3. Listed in the bottom portion of Table 9 are the focal length f, the f-number $F_{NO}$, and the image angle 2ω at each of the wide-angle and telephoto ends, respectively, for Embodiment 3.

TABLE 9

| # | R | D | $N_d$ | $v_d$ |
|---|---|---|---|---|
| 1 | 20.65000 | 0.85000 | 1.80348 | 40.4 |
| 2 | 4.18360 | 1.71705 | | |
| 3 | 5.51460 | 1.60000 | 1.84667 | 23.8 |
| 4 | 7.89450 | $D_4$(variable) | | |
| 5 (stop) | ∞ | 0.80000 | | |
| 6* | 4.24630 | 1.50000 | 1.69078 | 53.0 |
| 7* | -32.88330 | 0.14437 | | |
| 8 | 8.80850 | 0.66366 | 1.84667 | 23.8 |
| 9 | 3.50000 | $D_9$(variable) | | |
| 10 | 20.34720 | 1.40000 | 1.48749 | 70.2 |
| 11 | -11.46980 | $D_{11}$(variable) | | |
| 12 | ∞ | 1.30000 | 1.51680 | 64.2 |
| 13 | ∞ | | | | f = 6.06–11.21   $F_{NO}$ = 3.3–4.1   2ω = 57.1°–32.8°

Those surfaces with a * to the right of the surface number in Table 9 are aspherical, and the aspherical surface shape is expressed by Equation (A) above.

Table 10 below lists the values of the constants K, $A_4$, $A_6$, $A_8$, and $A_{10}$ used in Equation (A) above for each of the aspherical surfaces indicated in Table 9. An "E" in the data indicates that the number following the "E" is the exponent to the base 10. For example, "1.0E-02" represents the number $1.0 \times 10^{-2}$.

TABLE 10

| # | K | $A_4$ | $A_6$ | $A_8$ | $A_{10}$ |
|---|---|---|---|---|---|
| 1 | -3.68083 | 3.62433E-4 | 4.36244E-7 | 3.61685E-7 | -6.56129E-9 |
| 6 | 8.94946E-2 | 4.11495E-4 | -1.87979E-5 | -3.49109E-6 | -2.32073E-8 |
| 7 | 1.40135 | 8.93866E-4 | -1.47881E-4 | 8.70091E-6 | 3.59366E-8 |

In the zoom lens of Embodiment 3, all three lens groups move to vary their separations during zooming except that the second lens group $G_2$ and the third lens group $G_3$ maintain a substantially constant separation during zooming when the zoom lens is focused at infinity. Therefore, the values of the on-axis spacings $D_4$, $D_9$ and $D_{11}$ may vary.

Table 11 below lists the values of the variables $D_4$, $D_9$ and $D_{11}$ (i.e., the group spacings) at the wide-angle end (Wide) with a focal length of the three-group zoom lens of 6.06 mm, at an intermediate focal length (Middle) with a focal length of the three-group zoom lens of 8.24 mm, and at the telephoto end (Tele) with a focal length of the three-group zoom lens of 11.21 mm.

TABLE 11

| | Wide | Middle | Tele |
|---|---|---|---|
| $D_4$ | 9.524 | 5.254 | 2.112 |
| $D_9$ | 2.176 | 2.176 | 2.176 |
| | (1.762) | (1.811) | (1.531) |
| $D_{11}$ | 7.827 | 9.499 | 11.775 |
| | (8.241) | (9.865) | (12.420) |

The numbers not in parentheses in Table 11 are for the zoom lens focused at infinity. The numbers in parentheses in Table 11 are for the zoom lens focused at near points. The near points are at 100 mm and 200 mm from the on-axis location of the object side lens surface of the first lens element $L_1$ at the wide-angle and telephoto settings of the zoom lens, respectively.

The three-group zoom lens of Embodiment 3 of the present invention satisfies all of Conditions (1) through (7) above as set forth in Table 12 below. The bottom portion of Table 12 recites, where necessary, the quantities that have been used to calculate the values that satisfy Conditions (1) through (7).

TABLE 12

| Condition No. | Condition | Value |
|---|---|---|
| (1) | $0.4 < f_W / |f_1| < 0.7$ | 0.537 |
| (2) | $0.8 < f_T / |f_1| < 1.3$ | 0.993 |
| (3) | $0.3 < f_2 / f_3 < 1.0$ | 0.795 |
| (4) | $0.08 < D_{2W} / f_3 < 0.15$ | 0.143 |
| (5) | $v_{2p} - v_{2n} > 20$ | 29.2 |
| (6) | $N_{1n} > 1.68$ | 1.803 |
| (7) | $v_{1n} - v_{1p} > 11$ | 16.6 |

$f_W = 6.061$ mm  $f_1 = -11.2956$ mm  $f_T = 11.212$ mm  $f_2 = 12.144$ mm  $f_3 = 15.267$ mm  $D_{2W} = 2.176$  $v_{2p} = 53.0$  $v_{2n} = 23.8$  $v_{1n} = 40.4$  $v_{1p} = 23.8$

Figures 4A, 4B, 4C:
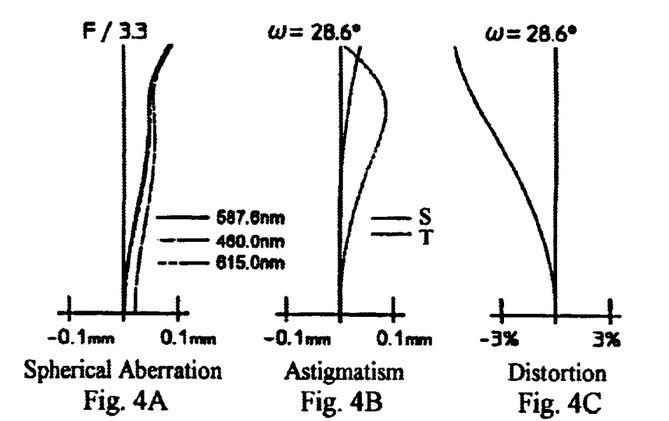
FIGS. 4A–4D show aberrations of Embodiment 3 of the zoom lens of the present invention at the wide-angle end.
Figure 4D:
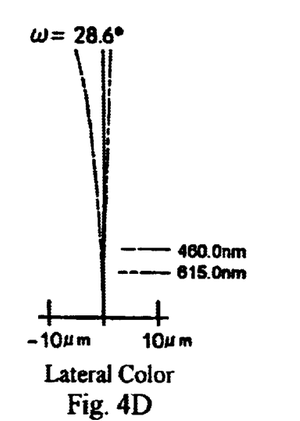
Figures 4E, 4F:
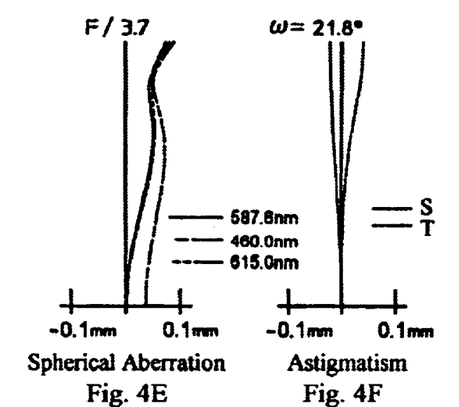
FIGS. 4E–4H show aberrations of Embodiment 3 of the zoom lens of the present invention at an intermediate position.
Figure 4G:
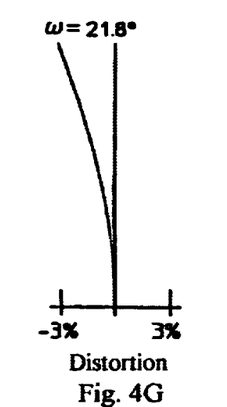
Figure 4H:
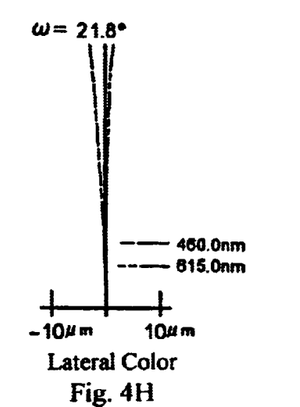
Figures 4I, 4J:
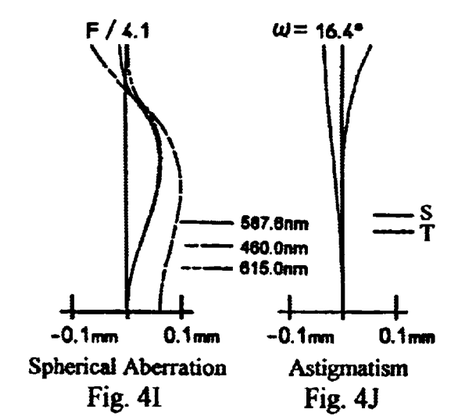
FIGS. 4I–4L show aberrations of Embodiment 3 of the zoom lens of the present invention at the telephoto end.
Figure 4K:
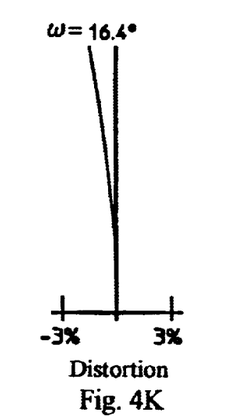
Figure 4L:
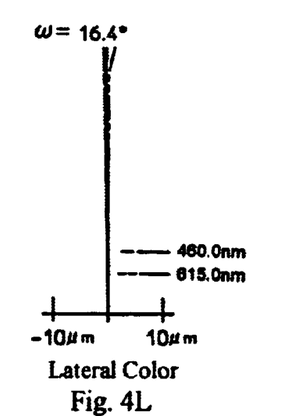

FIGS. 4A–4D show the spherical aberration, astigmatism, distortion, and lateral color, respectively, of the zoom lens of Embodiment 3 at the wide-angle end. FIGS. 4E–4H show the spherical aberration, astigmatism, distortion and lateral color, respectively, of the zoom lens of Embodiment 3 at the intermediate focal length, and FIGS. 4I–4L show the spherical aberration, astigmatism, distortion, and lateral color, respectively, of the zoom lens of Embodiment 3 at the telephoto end. In FIGS. 4A, 4E and 4I, the spherical aberration is shown for the wavelengths 587.6 nm (the d-line), 460.0 nm, and 615.0 nm. In the remaining figures, ω is the half-picture angle. In FIGS. 4B, 4F and 4J, the astigmatism is shown for both the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 460.0 nm and 615.0 nm relative to 587.6 nm (the d-line). As is apparent from these figures, the various aberrations are favorably corrected.

The present invention is not limited to the aforementioned embodiments, as it will be obvious that various alternative implementations are possible. For instance, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens formed of only three lens groups, in order from the object side, as follows:

a first lens group of negative refractive power;
a second lens group of positive refractive power; and
a third lens group of positive refractive power; wherein
the first lens group includes, in order from the object side, a negative meniscus lens component having its concave lens surface on the image side and a positive meniscus lens component having its convex surface on the object side, and the negative meniscus lens component includes a lens element having an aspherical lens surface;
the second lens group includes, in order from the object side, a positive lens component with its lens surface of greatest curvature being convex and on the object side, and a negative lens component with its lens surface of greatest curvature being concave and on the image side, the second lens group includes a diaphragm for limiting light passing through the zoom lens, and the second lens group includes a lens element having an aspherical lens surface;
all three lens groups move when zooming, and the second and third lens groups move toward the object side and decrease their distances from the first lens group during zooming from the wide-angle end to the telephoto end;
the distance between the second and third lens groups remains substantially constant when zooming while the zoom lens is focused at infinity;
the third lens group is moved toward the object side when focusing from infinity to a near point;
and the following condition is satisfied:

$$0.08 < D_{2W}/f_3 < 0.15$$

where $D_{2W}$ is the distance along the optical axis, when the zoom lens is at the wide-angle end and focused at infinity, between the lens surface of the second lens group that is nearest the image side and the lens surface of the third lens group that is nearest the object side; and $f_3$ is the focal length of the third lens group.

2. The zoom lens of claim 1, wherein the following condition is satisfied:

$$0.8 < f_T/|f_1| < 1.3$$

where $f_T$ is the focal length of the zoom lens at the telephoto end, and $f_1$ is the focal length of the first lens group.

3. The zoom lens of claim 1, wherein the following condition is satisfied:

$$0.4 < f_W/|f_1| < 0.7$$

where $f_W$ is the focal length of the zoom lens at the wide-angle end, and $f_1$ is the focal length of the first lens group.

4. The zoom lens of claim 1, wherein the following condition is satisfied:

$$0.3 < f_2/f_3 < 1.0$$

where $f_2$ is the focal length of the second lens group.

5. The zoom lens of claim 1, wherein the second lens group consists of two lens components, each of the two lens components consists of a single lens element, and the following condition is satisfied:

$$v_{2p} - v_{2n} > 20$$

where $v_{2p}$ is the Abbe number (at the d-line) of the positive lens element of the second lens group, and $v_{2n}$ is the Abbe number (at the d-line) of the negative lens element of the second lens group.

6. The zoom lens of claim 1, wherein the first lens group includes a single, negative lens element and the following condition is satisfied:

$$N_{1n} > 1.68$$

where $N_{1n}$ is the refractive index of the single negative lens element of the first lens group.

7. The zoom lens of claim 1, wherein the first lens group consists of two lens components, each of the two lens components of the first lens group consists of a single lens element, and the following condition is satisfied:

$$v_{1n} - v_{1p} > 11$$

where $v_{1n}$ is the Abbe number (at the d-line) of the negative lens element of the first lens group, and $v_{1p}$ is the Abbe number (at the d-line) of the positive lens element of the first lens group.

8. The zoom lens of claim 1, wherein each of the first and second lens groups consists of two lens components.

9. The zoom lens of claim 8, wherein each of the two lens components of each of the first and second lens groups consists of a single lens element.

10. The zoom lens of claim 1, wherein the third lens group consists of a single lens component.

11. The zoom lens of claim 1, wherein the third lens group consists of a single lens element.

12. The zoom lens of claim 8, wherein the third lens group consists of a single lens component.

13. The zoom lens of claim 8, wherein the third lens group consists of a single lens element.

14. The zoom lens of claim 9, wherein the third lens group consists of a single lens component.

15. The zoom lens of claim 9, wherein the third lens group consists of a single lens element.

16. The zoom lens of claim 2, wherein each of the first and second lens groups consists of two lens components, each of the two lens components of the second lens group consists of a single lens element, and the following conditions are satisfied:

$$0.4 < f_w/|f_1| < 0.7$$

where $f_w$ is the focal length of the zoom lens at the wide-angle end;

$$0.3 < f_2/f_3 < 1.0$$

where $f_2$ is the focal length of the second lens group; and $$v_{2p} - v_{2n} > 20$$

where $v_{2p}$ is the Abbe number (at the d-line) of the positive lens element of the second lens group, and $v_{2n}$ is the Abbe number (at the d-line) of the negative lens element of the second lens group.

17. The zoom lens of claim 16, wherein each of the two lens components of the first lens group consists of a single lens element, and the following conditions are satisfied:

$$N_{1n} > 1.68$$

where $N_{1n}$ is the refractive index of the negative lens element of the first lens group; and $$v_{1n} - v_{1p} > 11$$

where $v_{1n}$ is the Abbe number (at the d-line) of the negative lens element of the first lens group, and $v_{1p}$ is the Abbe number (at the d-line) of the positive lens element of the first lens group.

18. The zoom lens of claim 17, wherein the third lens group consists of a single lens component.

19. The zoom lens of claim 17, wherein the third lens group consists of a single lens element.

20. The zoom lens of claim 16, wherein each of the two lens components of the first lens group consists of a single lens element, and the third lens group consists of a single lens element.

* * * * *

UNITED STATES PATENT AND TRADEMARK OFFICE
CERTIFICATE OF CORRECTION

PATENT NO. : 6,654,180 B2
DATED : November 25, 2003
INVENTOR(S) : Ori

It is certified that error appears in the above-identified patent and that said Letters Patent is hereby corrected as shown below:

Column 2,
Line 58, change "are 25 indicated" to -- are indicated --;

Column 7,
Line 45, change "$F_{NO}$" to -- $F_{NO}$, --;

Column 8,
Line 62, change "$f_2 = 13.981$" to -- $f_2 = 13.981$ mm --;
Line 63, change "mm   $f_3 = 32.017$ mm" to -- $f_3 = 32.017$ mm --;
change "$v_{2n} =$" to -- $v_{2n} = 23.8$ --;
Line 64, change "23.8   $v_{1n} = 40.7$" to -- $v_{1n} = 40.7$ --;

Column 9,
Line 47, change "$F_{NO}$," to -- $F_{NO}$ --;
Line 55, Table 5, change "1" to -- 1* --;

Column 11,
Line 65, change "$F_{NO}$," to -- $F_{NO}$, --; and

Column 12,
Line 5, Table 9, change "1" to -- 1* --.

Signed and Sealed this

Twenty-seventh Day of April, 2004

JON W. DUDAS
*Acting Director of the United States Patent and Trademark Office*